(12) United States Patent
Lo

(10) Patent No.: US 8,077,776 B1
(45) Date of Patent: Dec. 13, 2011

(54) MOTION ESTIMATION FOR VIDEO COMPRESSION

(75) Inventor: Mankit Lo, Fremont, CA (US)

(73) Assignee: Xilinx, Inc., San Jose, CA (US)

( * ) Notice: Subject to any disclaimer, the term of this patent is extended or adjusted under 35 U.S.C. 154(b) by 1397 days.

(21) Appl. No.: 11/639,617

(22) Filed: Dec. 15, 2006

(51) Int. Cl.
*H04N 7/12* (2006.01)

(52) U.S. Cl. .................................. 375/240.16

(58) Field of Classification Search ............. 375/240.12, 375/0.13, 0.15–0.18, 0.21, 0.24; 382/236–238
See application file for complete search history.

(56) References Cited

U.S. PATENT DOCUMENTS

| | | | |
|---|---|---|---|
| 6,473,529 B1 * | 10/2002 | Lin ............................... | 382/236 |
| 6,591,015 B1 * | 7/2003 | Yasunari et al. ............. | 382/236 |
| 2004/0008780 A1 * | 1/2004 | Lai et al. .................. | 375/240.16 |
| 2005/0013366 A1 * | 1/2005 | Gallant et al. ........... | 375/240.16 |

OTHER PUBLICATIONS

Kumar et al., "Spatio-Temporal Texture Synthesis and Image Inpainting for Video Applications" Nov. 14, 2005, IEEE, vol. 3 Sep. 14, 2005, pp. II 85-8.*
U.S. Appl. No. 11/639,994, filed Dec. 14, 2006, Shimanek, Schuyler E., et al., Xilinx, Inc. 2100 Logic Drive, San Jose, CA 95124.

* cited by examiner

*Primary Examiner* — Thai Tran
*Assistant Examiner* — Stephen Smith
(74) *Attorney, Agent, or Firm* — W. Eric Webostad; Gerald Chan

(57) ABSTRACT

Motion estimation is described. A first portion of a predicted frame is obtained. The first portion is for a first predicted value. A first subset of a reference frame is obtained. The first subset is for a first reference value. Twice the first predicted value is subtracted from the first reference value. The outcome of the subtracting is multiplied by the first reference value to produce a partial result. The partial result is used for indication of a degree of difference between the first portion and the first subset.

20 Claims, 7 Drawing Sheets

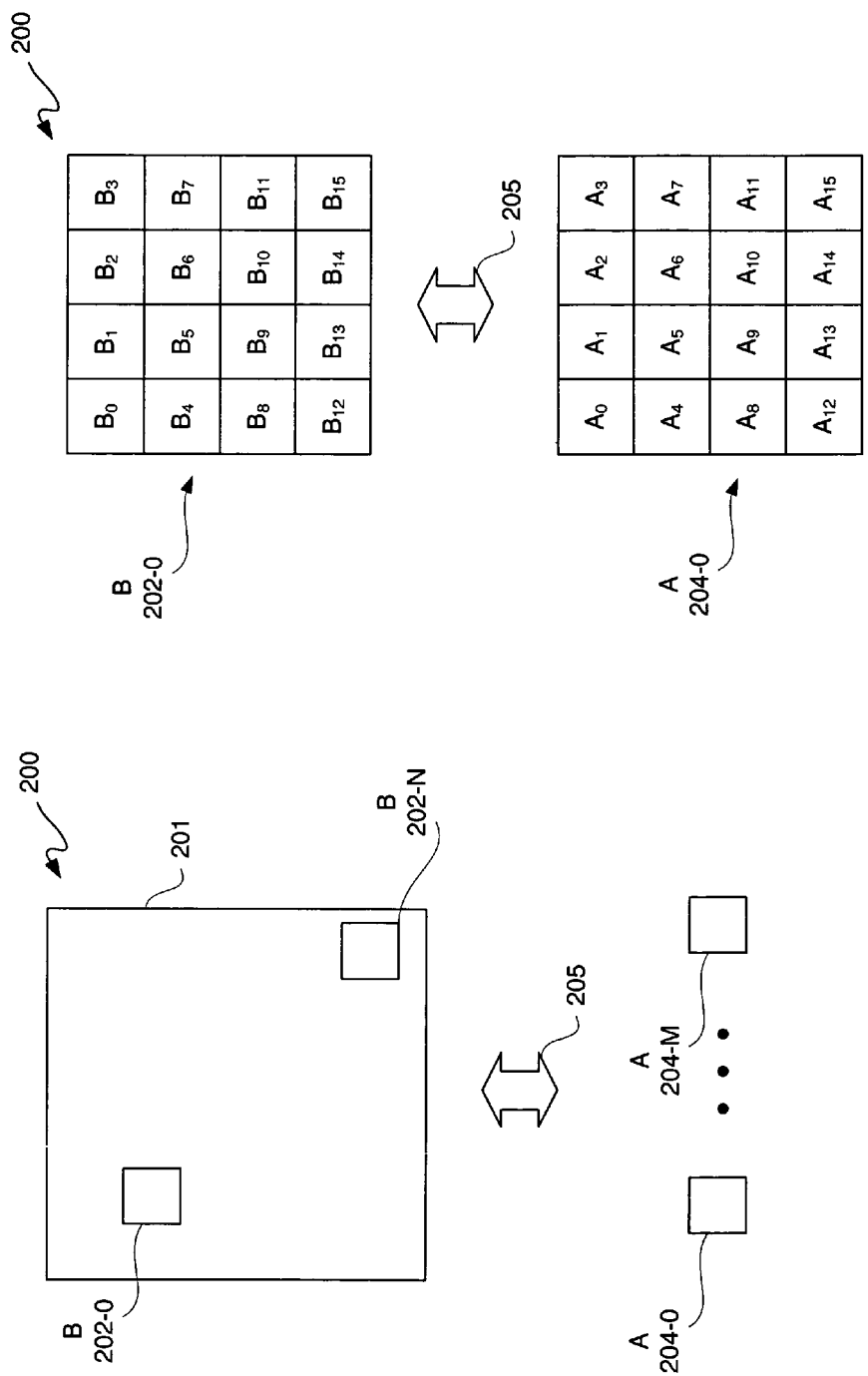

MOTION ESTIMATION FOR VIDEO COMPRESSION

FIELD OF THE INVENTION

One or more aspects of the invention relate generally to image processing and, more particularly, to motion estimation for video compression.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

One such FPGA is the Xilinx Virtex™ FPGA available from Xilinx, Inc., 2100 Logic Drive, San Jose, Calif. 95124. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block."

More recently, FPGAs have been used for video processing. In order to more conveniently send video over limited bandwidth networks, video compression is used. There are many known types of video compression, including that associated with the Motion Pictures Expert Group ("MPEG") among others. However, for purposes of clarity by way of example and not limitation, MPEG terminology is used.

In video compression, motion compensation may be used. Generally, a video sequence includes a number of pictures or frames. Frames in a sequence may be substantially similar, and thus contain a significant amount of redundant information. In video compression, this redundant information may effectively be removed by using a reference frame and a number of residual frames. As residual frames are indexed to a reference frame, they may contain less information than the reference frame. Accordingly, they may be encoded at a lower bit rate with the same quality as associated original frames from which they were obtained.

Another approach is to approximate motion of an entire scene and objects in a video sequence. Motion may be described by parameters which are encoded in a compressed video bitstream. Pixels of a predicted frame are approximated by translated pixels of a reference frame for motion estimation. Although this form of motion estimation may produce higher quality residual frames than the above-described motion compensation approach of subtracting differences between frames, the bit rate occupied by the parameters of this type of motion estimation may be significantly large.

In MPEG, frames are processed in groups. One frame, often the first frame of a group of frames, is encoded without motion compensation as a reference frame. This reference frame, which is an intracoded frame ("I-frame" or "I-picture") is combined with predicted frames ("P-frames or P-pictures"). One or more P-frames may be predicted from a preceding I-frame or P-frame.

Furthermore, frames may be predicted from future frames. Such predicted frames from future frames may be predicted from two directions, such as for example from an I-frame and a P-frame that respectively immediately precede and follow the bidirectionally predicted frame. Conventionally, bidirectionally predicted frames are called "B-frames" or "B-pictures". Other known details regarding MPEG video encoding are not described, as they are well known.

In block motion compensation ("BMC"), frames are partitioned into blocks, each of which is an array of pixels, sometimes referred to as "macroblocks." Groups of macroblocks, where each group is associated with a frame, are known as "slices." Each block is predicted from a block of equal size in a reference frame. Blocks are not transformed apart from the original frame other than being shifted to a position of a predicted block. This shift is represented as a motion vector. Such motion vectors are thus encoded into a video compressed bitstream.

Motion vectors need not be independent, for example if two neighboring blocks are associated with the same moving object, they may be differentially encoded to save bit rate. Accordingly, the difference between a motion vector and one or more neighboring motion vectors may be encoded. An entropy encoder/decoder ("CODEC") may exploit the resulting statistical distribution of motion vectors, such as around a zero vector, for encoding or decoding video.

Blocks may be shifted by integer or non-integer vectors. With respect to non-integer vectors this is generally referred to as sub-pixel precision. Sub-pixel precision conventionally involves interpreting pixel values. To avoid discontinuities introduced at block borders, generally referred to as block artifacts, variable block-size motion compensation ("VBSMC") may be used. VBSMC is BMC with the ability for an encoder to dynamically select block size. When encoding video, use of larger blocks may reduce the number of bits used to represent motion vectors. However, the use of smaller blocks may result in a smaller amount of prediction residual information to encode.

Furthermore, overlapped block motion compensation ("OBMC") may be used to increase prediction accuracy and avoid or reduce blocking artifacts. OBMC blocks may be significantly larger in each dimension and overlap quadrant wise with neighboring blocks. However, for OBMC, each pixel may belong to multiple blocks, and thus there are multiple predictions for each such pixel which may be summed up to a weighted mean. Accordingly, such blocks may be associated with a window function having a property which is the sum of overlapped windows.

Block motion estimation or overlapped block motion estimation ("BME" or "OBME", respectively) may be used to find an optimal or near optimal motion vector. The amount of prediction error for a block may be measured using a sum-of-absolute-differences ("SAD") between predicted and actual pixel values over all pixels associated with a motion compensated region, which may be associated with a slice.

Basically, optimal or near optimal motion vectors are calculated by determining block prediction error for each motion vector within a search range, and selecting the block prediction error that effectively has a best compromise between the amount of error and the number of bits needed for motion vector data.

A motion estimation calculation which tests all possible motion representations or blocks for such a search range is generally referred to as a full search optimization. A less time consuming approach than a full search optimization, though it is suboptimal with respect to rate distortion, involves use of a coarse search grid for a first approximation followed by refinement of such coarse search grid for areas surrounding this first approximation in one or more subsequent steps for producing one or more second approximations.

A more computationally intensive and higher image quality form of BME than SAD is to determine the sum-of-square differences ("SSD"). It should be appreciated that motion estimation may be substantially calculation intensive. The number of calculations may vary with the resolution of the image. For example, for High-Definition television ("HDTV") there may be approximately two million pixels in a frame where each pixel is motion estimated with blocks of a block size of 16 pixels by 16 pixels. Furthermore, this calculation is done for viewing at 30 frames per second ("fps"). For an SSD value, namely $\Sigma(A_j-B_i)^2$ where i goes from 0 to n, each $B_i$ is compared one at a time with an $A_j$. $A_j$ is for a macroblock, and $B_i$ is for a block of pixels in a reference image. There may be 0 to m macroblocks in a slice, and thus j may be from 0 to m. For a conventional SSD implementation, squaring adds a significantly complex, as well as resource costly, multiplier stage.

Accordingly, it would be desirable and useful to provide SSD quality motion estimation. Furthermore, it would be desirable and useful to provide such motion estimation that would be reasonable for implementation in an FPGA or other integrated circuit using DSP blocks.

SUMMARY OF THE INVENTION

One or more aspects of the invention generally relate to image processing and, more particularly, to motion estimation for video compression.

An aspect of the invention is a method for motion estimation. The method obtains a first portion of a predicted frame. The first portion is being for with a first predicted value. A first subset of a reference frame is obtained. The first subset is being for with a first reference value. Twice the first predicted value is subtracted from the first reference value. The outcome of the subtracting is multiplied by the first reference value to produce a partial result. The partial result is used for indication of a degree of difference between the first portion and the first subset.

Another aspect of the invention is an integrated circuit which has a digital signal processing block with a subtractor, a multiplier, and an adder. The subtractor is coupled to receive a value of a variable B and twice a value of a variable A ("2A") for providing a result of B(B−2A). The multiplier is coupled to receive the result of B(B−2A) and to receive the variable B for providing a result of B(B−2A). The variable B is associated with a reference array of pixels, the reference array of pixels is a subset of a reference frame. The variable A is associated with a predicted array of pixels, the predicted array of pixels is a subset of a predicted frame. The result of B(B−2A) is for motion estimation. The result of B(B−2A) is usable to provide an indication of degree of difference between the variable B and the variable A for determining degree of difference between the subset of the reference frame and the subset of the predicted frame.

Yet another aspect of the invention is a method for providing an engine for motion estimation. An array size of an array of pixels is determined, the array of pixels is for predicted data of a predicted frame. Embedded resources are associated to provide an array of digital signal processing blocks of the array size. Each digital signal processing block of the array of digital signal processing blocks are configured to perform a respective portion of an equation B(B−2A), where B is associated with reference data from a reference frame and A is associated with the predicted data from the predicted frame. The array of digital signal processing blocks is configured to propagate carry data from respective portions of the equation B(B−2A) and to propagate each output from each respective portion of the equation B(B−2A). A portion of the array of digital signal processing blocks is configured to add an associated respective portion of the carry data to an associated respective portion of the equation B(B−2A) from a prior stage of the array of digital signal processing blocks. First programmable logic is programmed to provide an addition stage to receive outputs from a final stage of the array of digital signal processing blocks for summing the outputs to produce a current indicator, the current indicator being associated with a Sum of Square Differences-based result.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 2 is a block diagram depicting an exemplary embodiment of a BME flow.

FIG. 3A is a block diagram depicting an example of blocks from a motion estimation flow.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
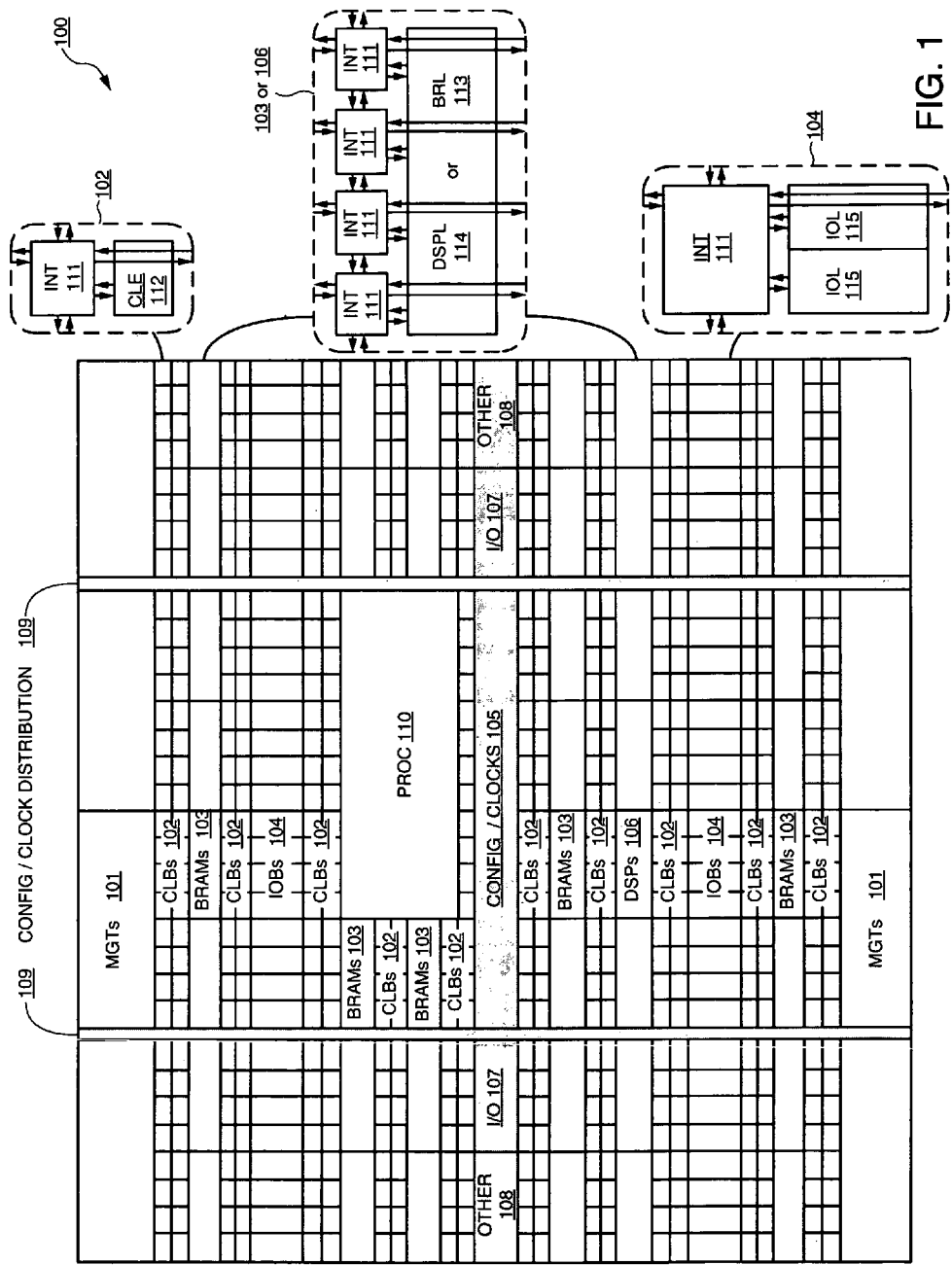
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-4™ FPGA from Xilinx of San Jose, Calif.

FIG. 2 is a block-flow diagram depicting an exemplary embodiment of a BME flow 200. BME flow 200 includes a reference frame 201 and M, for M an integer greater than 0, blocks ("A") 204-0 through 204-M. Reference frame 201 includes blocks ("B") 202-0 through 202-N, for N a positive integer greater than 0. Each block 204-0 through 204-M is compared with each of blocks 202-0 through 202-N using operator 205 for purposes of motion estimation. Thus, blocks 204-0 through 204-M may be thought of as a slice of macroblocks, and blocks 202-0 through 202-N may be thought of as arrays or sub-arrays of pixels of a reference frame. Notably, any of the motion estimation techniques described above, such as BME, OMBME, with or without variable block size for example, may be used with operator 205. For purposes of clarity by way of example and not limitation, it shall be assumed that blocks 202-0 through 202-N each include 16 pixels, and correspondingly blocks 204-0 through 204-M each include 16 pixels.

FIG. 3A is a block-flow diagram depicting an example of blocks 202-0 and 204-0 from motion estimation flow 200 of FIG. 2. In this example, a degree of difference between block 204-0 and 202-0 is determined using operator 205. Block 202-0 includes pixels $B_0$ through $B_{15}$, namely 16 pixels for a four-by-four array or block size. Furthermore, in this example, block 204-0 includes pixels $A_0$ through $A_{15}$, namely 16 pixels for a four-by-four array or block size. Notably, a block need not have multiple rows and multiple columns. Furthermore, it should be appreciated that other numerical sizes other than four-by-four, may be used.

Figure 3C:
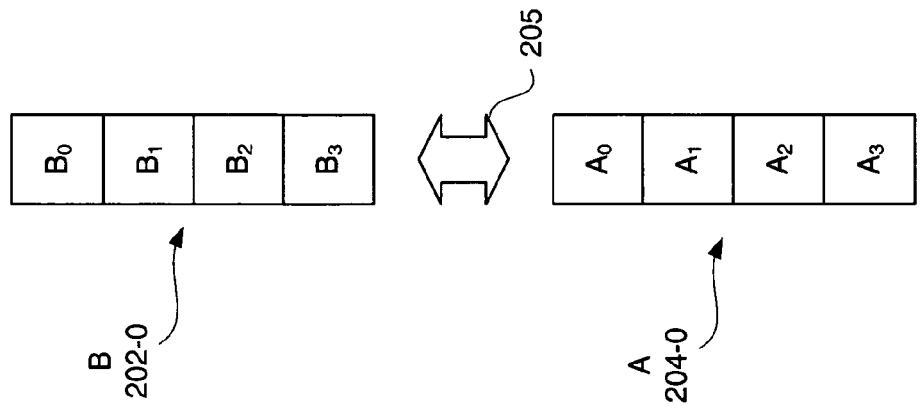
FIG. 3C is a block diagram depicting an exemplary embodiment of blocks that are each a single column of four pixels.
Figure 3B:
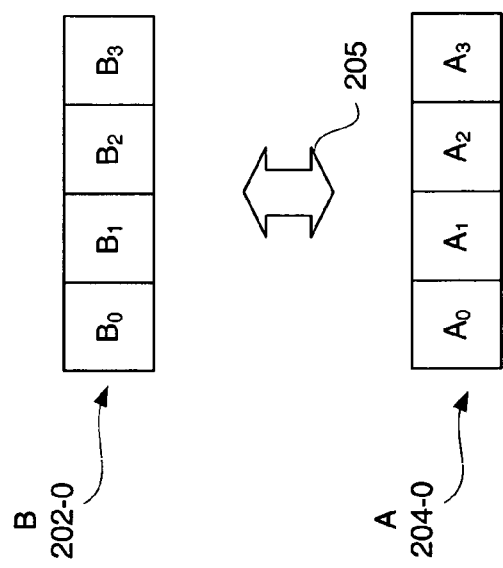
FIG. 3B is a block diagram depicting an exemplary embodiment of blocks that are each a single row of four pixels.

FIGS. 3B and 3C are block-flow diagrams depicting alternative exemplary embodiments where different array or block sizes are used. In FIG. 3B, blocks 202-0 and 204-0 are each a single row of four pixels. In FIG. 3C, blocks 202-0 and 204-0 are each a single column of four pixels each. Again, it should be appreciated that the number of four pixels used in the examples of FIGS. 3B and 3C is for purposes of clarity by way of example and not limitation. Accordingly, any number of pixels may be used.

The SSD equation may be written out as:

$$\sum_{i=0}^{N} (A_j - B_i)(A_j - B_i). \tag{1}$$

The above SSD equation, namely Equation (1), may be rewritten as:

$$\sum_{i=0}^{N} (A_j^2 - 2A_jB_i + B_i^2). \tag{2}$$

Notably, in each set of comparisons of an $A_j$ to a set of blocks $B_i$ for i from 0 to N, where each $A_j$ block is compared to a $B_i$ one at a time, $A_j$ is the same. Accordingly, the $A_j$ squared term does not provide any additional information with regard to differences between predicted and reference blocks for a jth comparison. Accordingly, the equation may be reduced to remove the $A_j$ squared term. This equation may be further simplified by factoring out a $B_i$ term. Accordingly, the equation may further be reduced to:

$$\sum_{i=0}^{N} B_i(B_i - 2A_i). \quad (3)$$

Notably, even though there are two summations for Equation (3) (e.g., over variables i and j), only one iteration (with respect to j) is represented for purposes of clarity and not limitation. Moreover, for purposes of clarity and not limitation, operator 205 is more generally represented as the equation B(B−2A).

Figure 4:
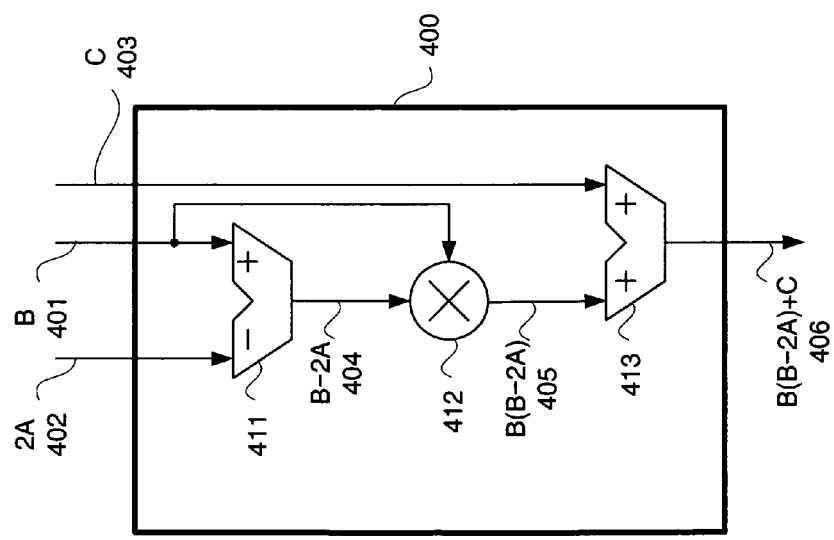
FIG. 4 is a circuit diagram depicting an exemplary embodiment of an implementation of an operator, namely a motion estimation block.

FIG. 4 is a circuit diagram depicting an exemplary embodiment of an implementation of operator 205, namely motion estimation block 400. Motion estimation block 400 includes a subtractor stage ("subtractor") 411, a multiplier stage ("multiplier") 412, and an adder stage ("adder") 413. A 2A value 402 is input to a minus port of subtractor 411, and a B value 401 is input to a plus port of subtractor 411. Output of subtractor 411 is a B−2A value 404. Output from subtractor 411 is provided as an input to multiplier 412. The B value 401 input to subtractor 411 is further provided as an input to multiplier 412. Output of multiplier 412 is a B(B−2A) value 405.

It should be appreciated that operator 205, may be used to produce SSD or SSD-like quality of motion estimation, without the overhead of a complex multiplier squaring as in a conventional SSD calculation implementation. Furthermore, it should be appreciated that arrays of pixels may be compared at a time with multiple estimation blocks 400, and thus motion estimation block 400 may be mapped responsive to block size of A and B to provide a circuit implementation of a motion estimation engine.

For cases when there is a prior stage to motion estimation block 400, output of multiplier 412 may be provided to a plus port of adder 413, and a carry value, such as carry C value 403, may be provided to another plus port of adder 413. Output of adder 413 is a B(B−2A)+C value 406. Accordingly, at this point of the description it should be understood that for motion estimation, and in particular for motion estimation for video compression or decompression, operator 205 may be used.

For compression, predicted values using operator 205 may be predicted prior to quantization of the predicted values. A discrete cosine transform ("DCT") may be used to encode data, and thus the predicted values may be DCT values, or more particularly, DCT coefficients. The video encoder therefore may be configured to determine the differences between actual and predicted DCT coefficient values using operator 205, and thus such differences may be encoded. For video decoding, coefficients may be reconstructed using the same type of prediction using operator 205 and then adding back in the difference sent from the encoder.

Accordingly, a predicted value for pixel-to-pixel comparison for a reference frame and a predicted frame may be obtained. This predicted value may be doubled and subtracted from a reference value of the reference frame. The outcome of this subtraction may be multiplied by the reference value from the reference frame to produce a partial result. This partial result indicates a degree of difference between the predicted frame and the reference frame, or more particularly the block of the predicted frame and the block of the reference frame. Multiple partial results may be added to provide and SSD or SSD-like motion estimation result, or more particularly a motion estimation vector.

Figure 5:
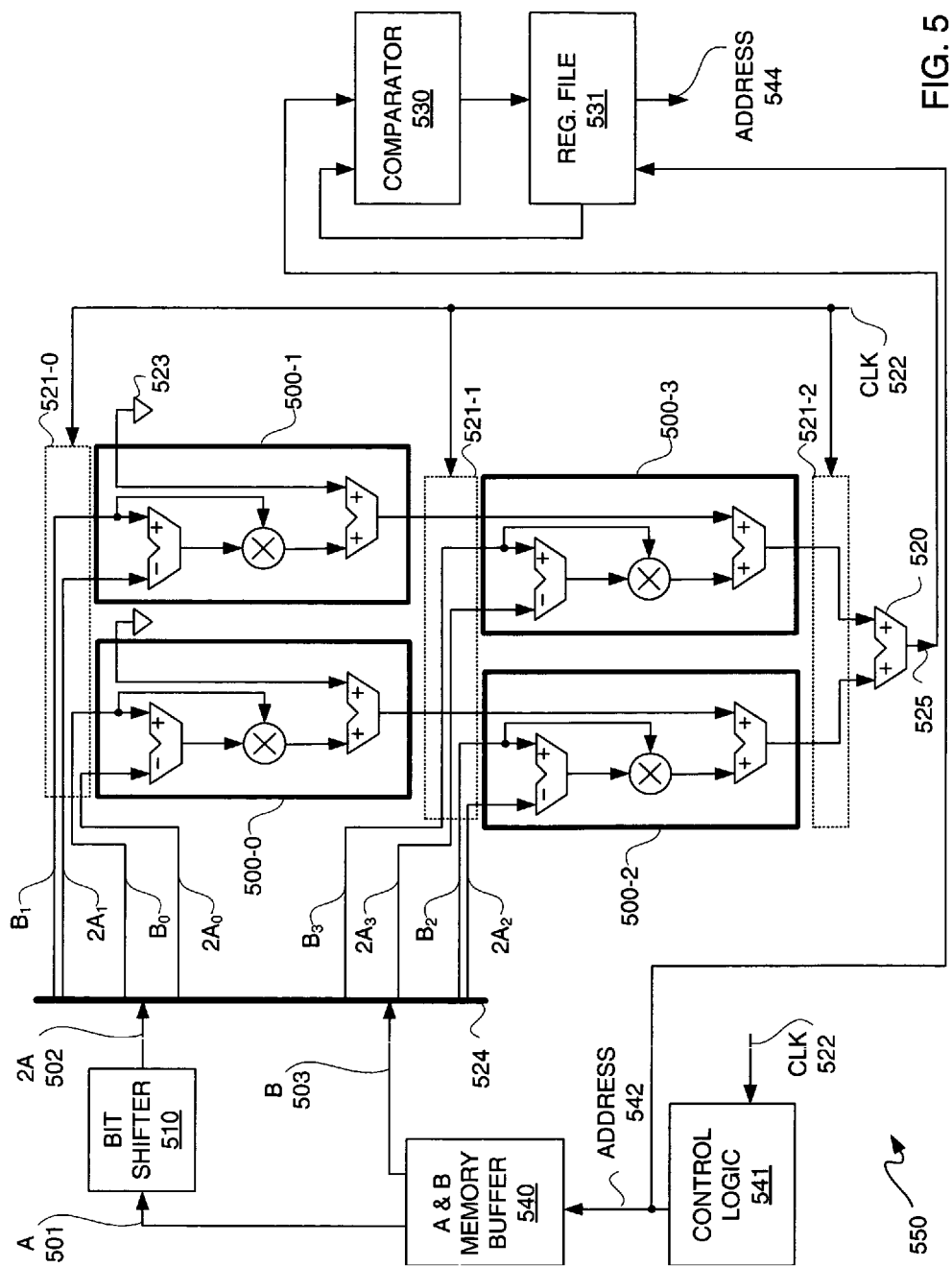
FIG. 5 is block/circuit diagram depicting an exemplary embodiment of a motion estimation engine.

FIG. 5 is block/circuit diagram depicting an exemplary embodiment of a motion estimation engine 550. Motion estimation engine 550 may be implemented in an FPGA, such as FPGA 100 of FIG. 1. Alternatively, motion estimation engine 550 may be implemented in an integrated circuit other than an FPGA.

Motion estimation engine 550 includes an array of DSP blocks 500-0 through 500-3. Though an example of a two-by-two array of DSP blocks is illustratively shown, it should be appreciated that other array dimensions may be used. For a variable block size, it should be appreciated that an FPGA may be dynamically reconfigured for mapping of block size to array size of DSP blocks, such as DSP blocks 500-0 through 500-3. Thus, it should be appreciated that for an FPGA implementation or any other programmable device, motion estimation engine 550 may be dynamically reconfigured responsive to block size of blocks A and B.

Control logic 541 of motion estimation engine 550 may be implemented in programmable logic of an FPGA. Control logic 541 may be configured to output address signal 542. Responsive to address signal 542, a block A and a block B stored in memory buffer 540 of motion estimation engine 550 may be read out as signals 501 and 503, respectively. Signal 501, which is an A block may be provided to a bit shifter 510. Notably, a shift of one bit may be used to convert block A 501 into a 2A block 502 output from bit shifter block 510. Signals 502 and 503 may be input to a data bus 524. Data bus 524 of motion estimation engine 550 may be configured using programmable interconnect logic of an FPGA for distributing pixel blocks or more particularly, pixel bit values. Furthermore, it should be appreciated that bit shifter 510 may be implemented using programmable logic of an FPGA and memory buffer 540 may be implemented using BRAM of an FPGA.

For the example of a two-by-two block size, an A block may have pixels $A_0$ through $A_3$, and a B block may have pixels $B_0$ through $B_3$, where the A block is associated with a predicted frame and the B block is associated with a reference frame. Signals $2A_0$ and $B_0$ from data bus 524 are provided to DSP block 500-0. In this particular example, DSP block 500-0 includes a subtractor in front of a multiplier and a follow-on adder. This configuration of a DSP block is described in additional detail in a co-pending application entitled "Enhanced Multiplier-Accumulator Logic For A Programmable Logic Device" by Schuyler E. Shimanek et al., filed Dec. 14, 2006, which is incorporated by reference herein in its entirety for all purposes. DSP block 500-0 alternatively may only include a multiplier and a follow-on adder, wherein the subtractor located before the multiplier is provided using programmable logic. It should be appreciated that each of DSP blocks 500-0 through 500-3 may be implemented as described more generally with reference to motion estimation circuit 400 of FIG. 4, and accordingly, detailed description regarding same circuit implementation is not repeated for purposes of clarity.

Signals $2A_1$ and $B_1$ are input to DSP block 500-1, signals $2A_2$ and $B_2$ are input to DSP block 500-2, and signals $2A_3$ and $B_3$ are input to DSP block 500-3. DSP blocks 500-0 and 500-1 are for a first stage of motion estimation digital signal processing. Accordingly, for a first stage of motion estimation, there is no carry information from a prior stage. Thus, a plus port of each of the follow-on adders of DSP blocks 500-0 and 500-1 may have a carry input thereto coupled to ground 523. Furthermore, it should be appreciated that the follow-on adder and the carry input port for an initial stage of processing of an array of DSP blocks are effectively superfluous, and thus in a tailored implementation may not be present. However, for DSP blocks 500-0 through 500-3 all formed using a same circuit, such adders and carry input ports may be used as described herein absent bypass circuitry.

Output of DSP block 500-0 and DSP block 500-1 is provided to a plus port of a follow-on adder of DSP block 500-2 and DSP block 500-3, respectively. It should be appreciated that the output of each DSP block 500-0 through 500-3 is a partial result for a motion estimation calculation. It should further be appreciated that the partial results output from DSP blocks 500-0 and 500-1 are provided respectively to DSP blocks 500-2 and 500-3 to be added with the partial results determined in each of those respective DSP blocks 500-2 and 500-3. Partial results output from DSP blocks 500-2 and 500-3 are provided to respective plus ports of adder 520. Adder 520 of motion estimation engine 550 may be implemented in programmable logic of an FPGA.

Register stages 521-0 through 521-2 may be used for pipelining information into and out of the array formed by DSP blocks 500-0 through 500-3, as well as interim pipelining between outputs from one stage to another stage of DSP blocks, such as DSP blocks 500-0 and 500-1 for respective input to DSP blocks 500-2 and 500-3.

As is known, DSP blocks may include registers. Furthermore, as is known registers are available as programmable logic resources in an FPGA. Notably, registers are not illustratively shown in detail for purposes of clarity and not limitation. Thus, for example input registers 521-0 may be used for registering signals $2A_0$, $B_0$, $2A_1$, and $B_1$ prior to input to DSP blocks 500-0 and 500-1. Additionally, interim registers 521-1 may be used for registering signals respectively output from DSP blocks 500-0 and 500-1, as well as signals $2A_2$, $B_2$, $2A_3$, and $B_3$ prior to input to DSP blocks 500-2 and 500-3. Lastly, output of DSP blocks 500-2 and 500-3 may be registered in an output register stage 521-2 for input to adder 520. Alternatively, output register stage 521-2 may be omitted or relocated.

Each register stage 521-0 through 521-2 may be clocked responsive to a same clock signal, such as clock signal 522. Additionally, clock signal 522 may be provided to control logic 541 for providing address signaling 542. Thus, each address may be incremented from control logic 541 for a particular search range implementation of motion estimation, and various associated output results 525 may be obtained by piping data through an array of DSP blocks 500-0 through 500-3.

Output 525 from adder 520 may be thought of as a series of $B(B-2A)+C$ values for different $B_i$'s, for an $A_j$. This output 525 may be sequentially provided as an input to comparator 530. It should be appreciated that output 525 is an indicator of the degree of difference between block A 501 and block B 503. Output of comparator 530 may be used to determine a minimum degree of difference between each block B of a sequence of blocks B 503 as compared with a block A 501. Accordingly, a register file 531 may be used to store a result from a comparator 530 operation, as well as an associated address from address signaling 542.

For example, an initial indicator may be stored in register file 531 as an initial minimum value. A subsequent indicator output from adder 520 may be provided to comparator 530. The previously stored indicator in register file 532 may be output to comparator 530 for comparison with the recently obtained output. If the recently obtained output is less than the previously registered output, then comparator 530 may provide the recently obtained output to register file 531 for overwriting the previously held value. If, however, the recently obtained output 525 value provided to comparator 530 is greater than the previously obtained output 525 value stored in register file 531 and used for comparison, then comparator 530 may indicate that no overwriting of register file 531 is to be done or simply do nothing but wait for a next input.

Once all B block values have been compared against an A block value, a minimum value is stored in register file 531. To associate this minimum value with a particular B block associated therewith, or an A and B block pair associated therewith, address information may be stored in register file 531 in association with such minimum value. Accordingly, an address obtained from address signaling 542 may be provided to register file 531 for storage, where such address is overwritten each time register file 531 is overwritten with a recently obtained output 525 associated with such address, and such an address is not overwritten if register file 531 is not overwritten with a recently obtained output 525. Accordingly, after a complete cycle of comparison is done, namely each B block is compared with an A block, register file 531, under control of control logic 541, which control signaling is not shown for purposes of clarity and not limitation, may output an address 544 associated with a minimum difference as between an block A 501 and a block B 503 of a set of block B's.

Notably, a minimum need not be used, and other known types of comparisons may be implemented without departing from the scope of this description. Furthermore, it should be appreciated that comparator 530 may be implemented in programmable logic. Furthermore, it should be appreciated that register file 531 may be implemented in registers of programmable logic of an FPGA. Even though an example of a two-by-two array is illustratively shown, it should be appreciated that any of a variety of array sizes may be used. Furthermore, it should be appreciated that using a DSP block architecture having a subtractor and an adder before and after a multiplier, respectively facilitates mapping of a reference or predicted frame block to an array of DSP blocks with less programmable logic and thus faster throughput by using embedded resources. Accordingly, it should be appreciated that the availability of embedded DSP blocks in an FPGA may lead to a significantly high bit rate for motion estimation for video compression or decompression, or both, using an array of such DSP blocks to provide a motion estimation engine, such as motion estimation engine 550.

Figure 6:
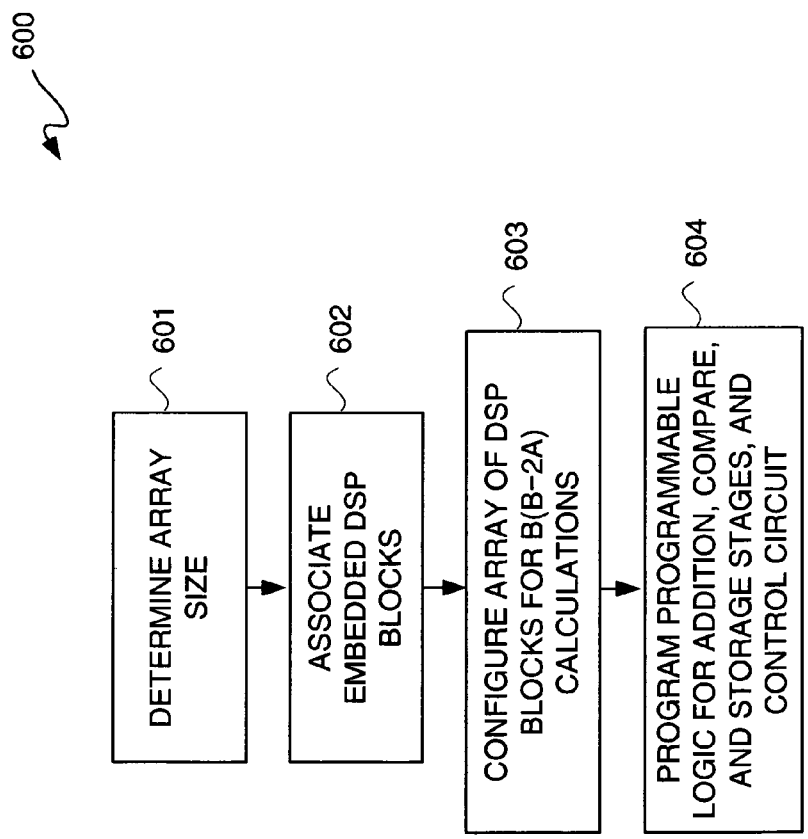
FIG. 6 is a flow diagram depicting an exemplary embodiment of a motion estimation engine configuration flow.

FIG. 6 is a flow diagram depicting an exemplary embodiment of a motion estimation engine confirmation flow 600. At 601, an array size for a block is determined. At 602, DSP blocks are associated with the array size determined at 601. Notably, these DSP blocks may be embedded in an FPGA. It should be appreciated that embedded or hardwired blocks may facilitate faster data throughput in comparison to use of programmable logic which may be slower than embedded DSP blocks.

At 603, the array of DSP blocks may be configured for $B(B-2A)$ calculations. As previously described this may involve data busing, as well as interconnecting of DSP blocks. At 604 programmable logic may be programmed to provide a final add stage for such calculations, a compare stage, and a storage stage, as well as control logic. As previously described, bit shifting, control logic, and compare logic may be implemented in programmable logic. Additionally, a register file may be implemented in programmable logic. It should be understood with reference to FIG. 5 that adder 520 may be implemented in programmable logic in order to scale with the size of an array of DSP blocks. In the particular example of FIG. 5, there were only two outputs from the array of DSP blocks provided as respective inputs to adder 520. However, a final add stage may be configured to handle more than two inputs. For example, for an MPEG macroblock, a four-by-four array of DSP blocks may be implemented, in which implementation four outputs from such an array of DSP blocks may be provided to a final add stage for producing an output 525 indicator. Notably, under the control of control logic, $A_j$ may be sequentially incremented after each comparison with a set of $B_i$'s is complete.

Figure 7:
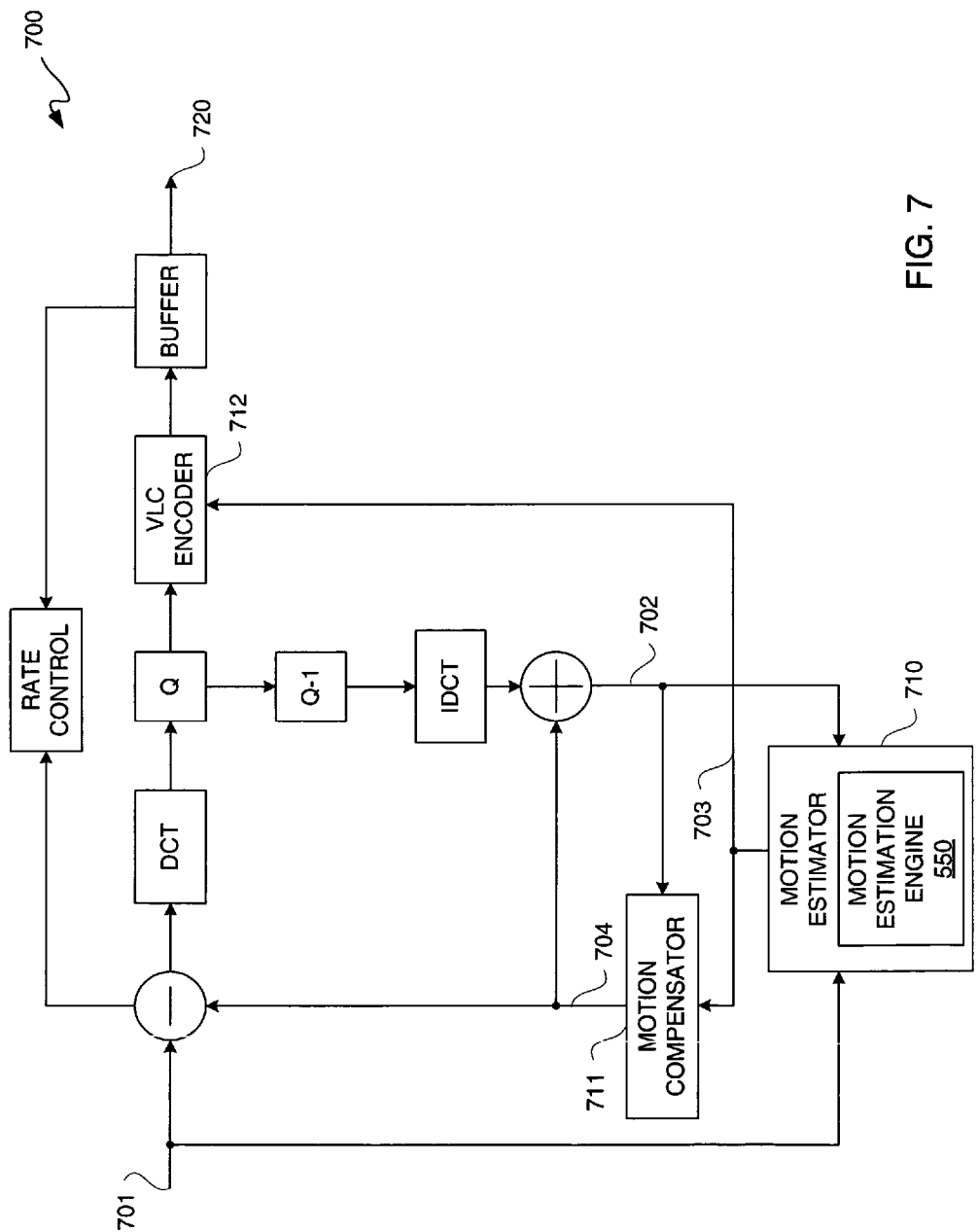
FIG. 7 is a block diagram depicting an exemplary embodiment of a video encoder system.

FIG. 7 is a block diagram depicting an exemplary embodiment of a video encoder system 700. Video encoder system 700 may be part of a video CODEC. Video encoder system 700 may be implemented in an FPGA, such as FPGA 100 of FIG. 1. As video encoder system 700, apart from motion estimation engine 550 as part of a motion estimator module 710, is conventional, known details regarding video encoder system 700 are not described herein for purposes of clarity.

New frame data 701 is input to motion estimator 710. Additionally, reconstructed frame data 702 is input to motion estimator 710. Responsive to new frame data 710 and reconstructed frame data 702, motion estimator module 710 uses motion estimation engine 550 to generate motion vectors 703. Again, motion estimation engine 550 may be scaled, such as for example size of array of DSP blocks, to the size of incoming data to motion estimator 710.

Motion vectors 703 are input to motion compensator 711; also input to motion compensator 711 is reconstructed frame data 702. Motion compensator 711 produces predicted frame data 704. Motion vectors 703 are further input to Variable Length Code ("VLC") encoder 712 for producing compressed video frame data 720.

While the foregoing describes exemplary embodiment(s) in accordance with one or more aspects of the invention, other and further embodiment(s) in accordance with the one or more aspects of the invention may be devised without departing from the scope thereof, which is determined by the claim (s) that follow and equivalents thereof. Claim(s) listing steps do not imply any order of the steps. Trademarks are the property of their respective owners.

What is claimed is:

1. A method for motion estimation, the method comprising:
    obtaining a first portion of a predicted frame, the first portion being for a first predicted value;
    obtaining a first subset of a reference frame, the first subset being for a first reference value;
    subtracting twice the first predicted value from the first reference value; and
    multiplying, using an integrated circuit, an outcome of the subtracting by the first reference value to produce a partial result, the partial result for indication of a degree of difference between the first portion and the first subset.

2. The method according to claim 1, further comprising:
    the first portion having a first set of first predicted values including the first predicted value, the first set of predicted values being associated with predicted pixel data of the predicted first frame;
    the first subset having a first set of reference values including the first reference value, the first set of reference values being associated with first reference pixel data of the reference frame;
    arraying of the first set of predicted values and the first set of reference values relative to one another for the subtracting and the multiplying; and
    the first set of predicted values and the first set of reference values being arrayed for respectively performing the subtracting and the multiplying to generate a first set of partial results including the partial result.

3. The method according to claim 2, wherein array pixel dimensions of the first portion and the first subset are equivalent, and wherein the arraying is responsive to array pixel dimension of the first portion.

4. The method according to claim 3, further comprising:
    adding the first set of partial results together to produce a first indicator of degree of difference between the first portion and the first subset; and
    storing the first indicator.

5. The method according to claim 4, further comprising
    obtaining a second subset from the reference frame different from the first subset, the second subset having a second set of reference values, the second set of reference values associated with second reference pixel data of the reference frame;
    repeating the subtracting and the multiplying as arrayed using the first set of predicted values and the second set of reference values;
    respectively performing the subtracting and the multiplying to generate a second set of partial results using the first set of predicted values and the second set of reference frame values;
    adding the second set of partial results together to produce a second indicator of degree of difference between the first portion and the second subset; and
    comparing the second indicator to the first indicator to determine whether the second subset is a closer match to the first portion than the first subset.

6. The method according to claim 5, further comprising:
    overwriting the first indicator with the second indicator responsive to the second indicator being less than the first indicator.

7. The method according to claim 3, wherein the array pixel dimension is for an array selected from a group consisting of a one row and multiple column array, a multiple row and one column array, and a multiple row and multiple column array.

8. The method according to claim 3, wherein the array pixel dimension is for an array having multiple rows and multiple columns; and the method further comprising:
    generating carry bits associated with a row of the array; and
    respectively adding the carry bits with the first set of partial results to produce the first indicator.

9. An integrated circuit, comprising:
    a digital signal processing block having a subtractor, a multiplier, and an adder;
    the subtractor coupled to receive a value of a variable B and twice a value of a variable A ("2A") for providing a result of B−2A; and
    the multiplier coupled to receive the result of B−2A and to receive the variable B for providing a result of B(B−2A);
    the variable B being associated with a reference array of pixels, the reference array of pixels being a subset of a reference frame;
    the variable A being associated with a predicted array of pixels, the predicted array of pixels being a subset of a predicted frame; and
    the result of B(B−2A) being for motion estimation;
    wherein the result of B(B−2A) is usable to provide an indication of degree of difference between the variable B and the variable A for determining degree of difference between the subset of the reference frame and the subset of the predicted frame.

10. The integrated circuit according to claim 9, wherein the adder is coupled to receive the result of B(B−2A) for addition with a carry value C for providing a result of B(B−2A)+C.

11. The integrated circuit according to claim 10, wherein the carry value C is from a prior stage of digital signal processing with respect to the digital signal processing block.

12. The integrated circuit according to claim 11, further comprising:
   a plurality of digital signal processing blocks including the digital signal processing block for providing a respective plurality of results; and
   an addition stage coupled to receive the plurality of results including the result of B(B−2A)+C;
   the addition stage configured to add the plurality of results together to provide an indicator of the degree of difference between the reference frame and the predicted frame.

13. The integrated circuit according to claim 12, wherein the plurality of digital signal processing blocks is a last row in an array of digital signal processing blocks, the array of digital signal processing blocks mapped to provide a motion estimation engine, the motion estimation engine for comparing each of a plurality of subsets of the reference frame including the subset of the reference frame with the subset of the predicted frame using a plurality of respectively associated generated indicators including the indicator.

14. The integrated circuit according to claim 13, wherein the motion estimation engine is further for comparing each of the plurality of subsets of the reference frame with each of a plurality of subsets of the predicted frame including the subset of the predicted frame, wherein each of the subsets of the predicted frame is accessed one at a time for comparison to each of the plurality of subsets of the reference frame.

15. The integrated circuit according to claim 14, further comprising:
   memory coupled to store variables A and B including the variable A and the variable B and configured to output the variable A and the variable B responsive to an input address;
   a bit shifter coupled to receive the variable A and configured to provide double the value of the variable A;
   a comparator coupled to respectively receive the indicators for the comparing each one at a time in a sequence; and
   a storage device coupled to the comparator for storing a compare output associated with a minimum degree of difference and coupled for receiving the input address for association with the compare output stored in the storage device.

16. The integrated circuit according to claim 14, wherein the addition stage is formed using programmable logic of a programmable logic device; and wherein the comparison is for motion estimation for digital video compression using a modified form of Sum of Square Differences.

17. A method for providing an engine for motion estimation, comprising:
   determining an array size of an array of pixels, the array of pixels being for predicted data of a predicted frame;
   associating embedded resources to provide an array of digital signal processing blocks of the array size;
   configuring each digital signal processing block of the array of digital signal processing blocks to perform a respective portion of an equation B(B−2A), where B is associated with reference data from a reference frame and A is associated with the predicted data from the predicted frame;
   the array of digital signal processing blocks configured to propagate carry data from respective portions of the equation B(B−2A) and to propagate each output from each respective portion of the equation B(B−2A);
   a portion of the array of digital signal processing blocks configured to add an associated respective portion of the carry data to an associated respective portion of the equation B(B−2A) from a prior stage of the array of digital signal processing blocks; and
   programming first programmable resource to provide to receive outputs from a final stage of the array of digital signal processing blocks for summing the outputs to produce a current indicator, the current indicator being associated with a Sum of Square Differences-based result.

18. The method according to claim 17, further comprising:
   programming second programmable resource to provide a compare stage for receiving the current indicator and a prior indicator.

19. The method according to claim 18, further comprising programming third programmable resource to provide a storage stage for receiving a smaller of the current indicator and the prior indicator from the compare stage and to provide the prior indicator stored in the storage stage to the compare stage.

20. The method according to claim 17, wherein the embedded resources used to provide the array of digital signal processing blocks are of a programmable logic device.

* * * * *